United States Patent [19]
Clauss et al.

[11] Patent Number: 5,924,508
[45] Date of Patent: Jul. 20, 1999

[54] PROCESS FOR CARRYING OUT AN AUTOMATIC BRAKING OPERATION

[75] Inventors: Johannes Clauss, Bietigheim-Biss; Walter Klinkner, Stuttgart; Bernd Knoff, Esslingen; Manfred Steiner, Winnenden, all of Germany

[73] Assignee: Daimler-Benz Aktiengesellschaft, Stuttgart, Germany

[21] Appl. No.: 08/897,822

[22] Filed: Jul. 21, 1997

[30] Foreign Application Priority Data

Jul. 20, 1996 [DE] Germany ............ 196 29 229

[51] Int. Cl.⁶ ...................................... B60T 7/12
[52] U.S. Cl. ............... 180/179; 180/170; 180/175; 303/3; 303/125; 303/135; 701/93
[58] Field of Search .................. 303/3, 155, 135, 303/125, 113.4, 113.3, 140, 141, 114.3, 191, 193, 199; 192/221; 340/439, 463, 576, 479, 468, 466; 188/355–359; 180/170–179; 701/93–98, 110; 477/186, 154, 108, 144, 94, 119

[56] References Cited

U.S. PATENT DOCUMENTS

| 4,541,052 | 9/1985 | McCulloch | 180/179 |
| 5,472,264 | 12/1995 | Klein et al. | 303/3 |
| 5,835,008 | 11/1998 | Colemere, Jr. | 701/70 |

FOREIGN PATENT DOCUMENTS

| 43 25 940 C1 | 12/1994 | Germany . |
| 43 38 070 C1 | 2/1995 | Germany . |
| 44 13 172 C1 | 3/1995 | Germany . |
| 44 22 664 A1 | 3/1995 | Germany . |

OTHER PUBLICATIONS

Gut reagiert, Auto Motor Sport, Dec. 1996, pp. 40–41.

*Primary Examiner*—Douglas C. Butler
*Attorney, Agent, or Firm*—Evenson, McKeown, Edwards & Lenahan, P.L.L.C.

[57] ABSTRACT

A process carries out an automatic braking operation in which, when the return speed of the accelerator pedal exceeds a threshold value and a transfer of the driver's foot from the accelerator pedal to the brake pedal is determined, an automatic braking operation is triggered. During that operation, a brake pressure is generated in the wheel brakes and is terminated when either a defined time has been exceeded since the triggering of the braking operation or when an operation of the brake pedal takes place by the driver. A support of the driver is ensured when operating the brake pedal in critical driving situations and a brake pressure buildup is carried out even before the operation of the brake pedal by the driver. After the automatic braking operation has been triggered, monitoring occurs to determine whether the time derivation of a quantity representing the operation of the brake pedal exceeds a threshold rise value. In such event, exceeding of the threshold rise value must take place within a defined time period after the triggering of the automatic braking operation, whereby the automatic braking operation is continued.

48 Claims, 5 Drawing Sheets

PROCESS FOR CARRYING OUT AN AUTOMATIC BRAKING OPERATION

BACKGROUND AND SUMMARY OF THE INVENTION

This application claims the priority of German application 196 29 229.8, filed Jul. 20, 1996, the disclosure of which is expressly incorporated by reference herein.

The present invention relates to a process for carrying out a braking operation, and more particularly, to a process in which the transfer of the driver's foot from the accelerator pedal in the direction of the brake pedal is sensed and, when the accelerator pedal return speed exceeds a threshold value and a transfer of the driver's foot is sensed, an automatic braking operation is triggered during which a brake pressure is built up in wheel brakes, and the triggering of the automatic braking operation triggering a first time sensing.

An automatic braking is described in *Auto Motor und Sport*, (p. 40, Motorsportpresse Stuttgart, Volume 12/1996, Mar. 31, 1996).

According to the general automatic braking process to which the present invention is directed, the return speed of the accelerator pedal exceeds a. threshold value and a transfer of the driver's foot from the accelerator pedal to the brake pedal is determined, so that an automatic braking operation is triggered during which a brake pressure is generated in the wheel brakes. The automatic braking operating is terminated when either a certain time has passed since the triggering of the braking operation or when an operation of the brake pedal by the driver occurs.

Furthermore, a process for implementing an automatic braking operation is described in DE 44 13 172 C1 during whose implementation a braking pressure is generated which is higher than a braking pressure which corresponds to the brake pedal position. The triggering of the automatic braking operation will then take place when the operating speed of the brake pedal exceeds a threshold value. The threshold value is adapted to the actual driving situation as a function of the succession of the pedal operations and of the type and method of their implementation. An automatic braking operation, as described in DE 44 13 172 C1, can be terminated, for example, by a termination criterion corresponding to DE 43 38 070 C1. Additional criteria for terminating an automatic braking operation are described in DE 43 25 940 C1. The teachings in these documents are incorporated herein.

Although the process to which the present application is directed initiates an automatic braking operation early, even before the operation of the braking pedal, it is not capable of supporting, in a critical driving situation, the buildup of a brake pressure during the operation of the brake pedal by the driver. A process described in DE 44 13 172 C1 is incapable of recognizing a dangerous situation before the operation of the brake pedal by the driver. Thus, in comparison to the process to which the present application is directed, time is lost for the braking pressure buildup in said described process.

It is, therefore, an object of the present invention to provide a process which ensure a support of the driver during the brake pedal operation in critical driving situations and also carries out a brake pressure buildup before the driver operates the brake pedal, or of preparing the buildup to such an extent that an accelerated brake pressure buildup is achieved with the braking operation by the driver in critical driving situations.

This object has been achieved according to the present invention by providing a method in which a quantity is sensed which represents the operation of the brake pedal, the gradient of the quantity representing the operation of the brake pedal is determined, and in that the automatic braking operation is terminated if the gradient of the quantity representing the operation of the brake pedal exceeds the threshold rise value not before the exceeding of a first time limit value by the first time sensing or the switching of the brake light switch from the inoperative into the operative switching position triggers a second time sensing, a quantity representing the operation of the brake pedal is sensed, the gradient of the quantity representing the operation of the brake pedal is determined, and in that the automatic braking operation is terminated when either the switching of the brake light switch does not take place before the exceeding of a first time limit value by the first time sensing. Alternatively, the method can provide that, if the gradient of the quantity representing the operation of the brake pedal exceeds a threshold rise value not before the exceeding of a second time limit value by the second time sensing or with the triggering of the automatic braking operation, a brake pressure is generated, the automatic braking operation being terminated with the exceeding of a first time limit value if previously a quantity representing the operation of the brake pedal has exceeded a threshold rise value. Similarly, with the termination of the cruise control, an automatic braking operation is triggered, a brake pressure being generated in the wheel brakes during the automatic braking operation which brake pressure corresponds to the application of the brake pads onto the brake disk.

After an automatic braking operation has been triggered, the process according to the present invention monitors whether the time derivation of a quantity representing the operation of the brake pedal exceeds a threshold rise value. The exceeding of the threshold rise value must take place within a certain time period after the triggering of the automatic braking operation. It can also be required that the exceeding of the threshold rise value also takes place within a defined time period after the switching of the brake light switch from its inoperative switching position (brake lights off, BLS=0) into its operative switching position (brake lights on; BLS=1). Thereby, the existence of whether a critical driving situation is reliably and advantageously determined. If this situation is recognized, the automatic braking operation is continued.

According to another of the above-mentioned embodiments, it is not required to sense the transfer of the driver's foot between the accelerator pedal and the brake pedal. The automatic braking operation will then be triggered only on the basis of the accelerator pedal return speed. This intervention also must be limited with respect to time so that unintentionally, the vehicle will not be braked too much.

In addition to the on-time operation of the brake pedal, a rise of the operating force of the brake pedal beyond an operating force threshold value can also be required in order to continue the automatic braking operation. It is particularly advantageous for the braking pressure in the wheel brakes to be limited so that the braking effect achieved before the operation of the brake remains low. In the case of critical driving situations, a shortening of the required braking distance will still be achieved because the easing play of the wheel brake cylinders can be overcome also without generating a braking effect. A further increase of the brake pressure can be generated by the buildup of brake pressure in the master brake lines.

According to various embodiments of the present invention, the pedal travel, the pedal operating speed, the operating force or the brake pressure in the master brake lines can be used as the quantity representing the brake pedal operation.

Additional embodiments of the present invention relate to the determination of the second time threshold value which concerns the time after the switching of the brake light switch and the determination of the threshold rise value.

Another of the above-described embodiments according to the present invention involve a process for triggering a corresponding automatic braking operation in the case of vehicles with a cruise control for controlling the vehicle speed independently of the operation of the brake pedal by the driver. In this case, the termination of the cruise control triggers the automatic braking operation. A predetermined vehicle deceleration is set, this vehicle deceleration preferably being achieved by an engine drag torque. Prior thereto, however, the easing play of the wheel brakes is overcome in that a brake pressure is set in the wheel brake cylinders which corresponds to the application of the brake pads to the brake disks. As a result, in the event of a subsequent braking, a shortening of the braking distance is achieved. This occurs particularly when, with a subsequent, possibly additional operation of the brake, a critical driving situation is recognized because of the fact that the gradient of a quantity representing the operation of the brake pedal exceeds a threshold value and the automatic braking operation is continued such that a higher brake pressure is set than that corresponding to the operation of the brake pedal.

Other advantageous embodiments of the present invention correspond to the brake pressure to be generated in the wheel brakes after the triggering of the automatic braking operation. This brake pressure can be limited to a defined extent or can be regulated such that the vehicle deceleration does not exceed a defined extent. These embodiments have the advantage that they limit the deceleration of the vehicle before the driver operates the brake pedal and therefore avoid an uncomfortable jerking of the vehicle when the automatic braking operation is terminated. In addition, the performance of the vehicle is easier to judge by the driver who is following.

Still other advantageous embodiments of the present invention provide the automatic braking operation after the threshold rise value has been exceeded. Accordingly, a brake pressure will then be generated in the wheel brakes which is higher than the brake pressure which corresponds to the position of the brake pedal. In particular, the generated brake pressure may be such that control of the brake pressure by an antilock system takes place at least on some of the wheels.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
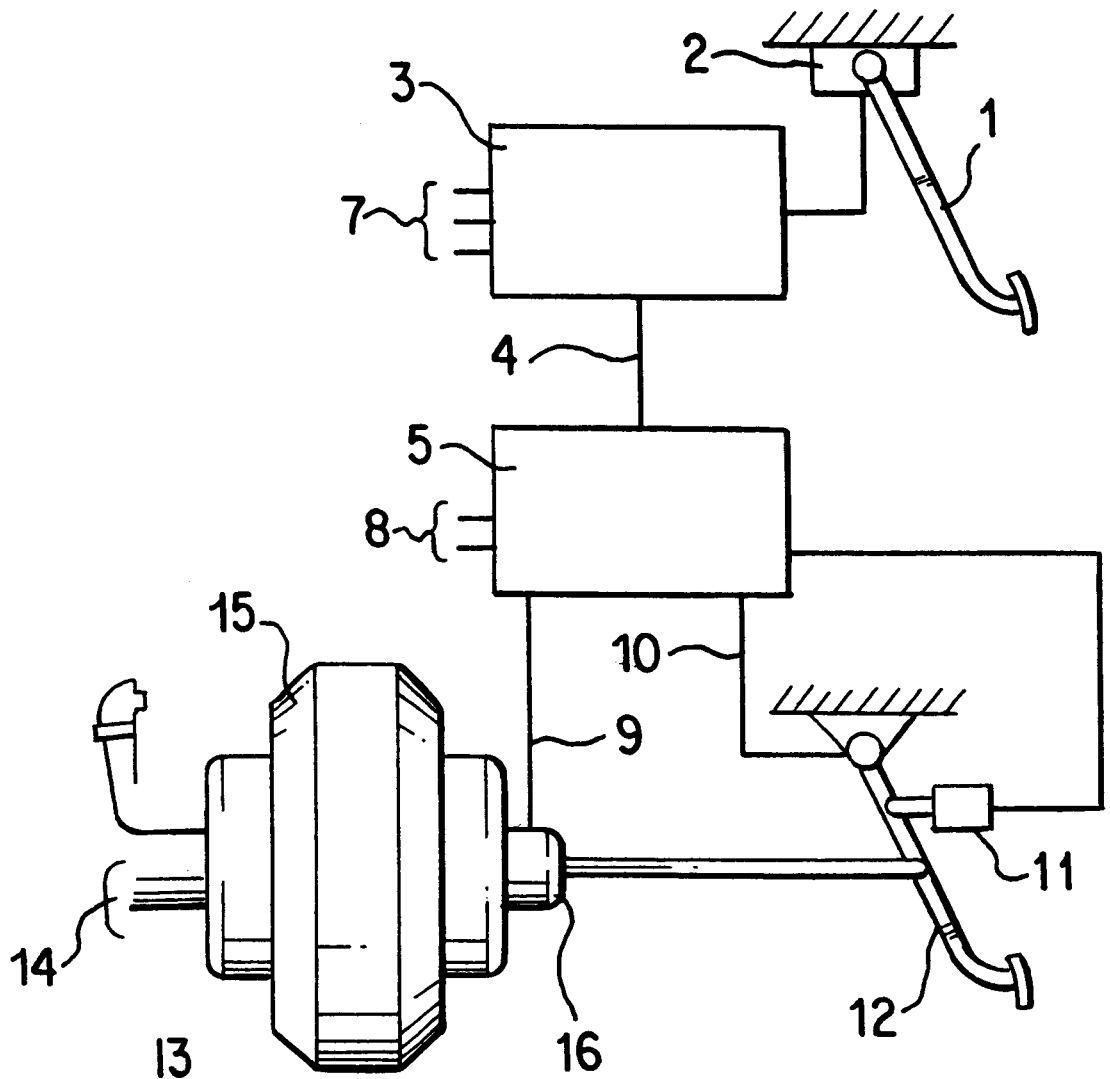
FIG. 1 is a schematic representation of an arrangement for carrying out processes according to the present invention.

In the arrangement of FIG. 1 for carrying out the processes according to the present invention, the position of the accelerator pedal 1 is sensed by the pedal travel sensor 2 and is transmitted to the gas control device 3. The accelerator pedal return speed (vg) can be determined in this gas control device from the sensed position of the accelerator pedal. The data line 4 connects the gas control device 3 with the control device 5 for the automatic braking operation. Additional data lines 7 or 8 can connect both control devices 3, 5 with additional sensors, adjusting devices (e.g., the brake pressure control valves of the antilock system) and control units. Furthermore, a signal of the travel of the brake pedal 12 is supplied to the control device 5 by way of the line 10.

A brake light switch 11, on one hand, switches the brake lights (not shown), but its signal is also supplied to the control device 5. The control line 9 allows the control device to control the switching valve 16 of the brake power assist unit 15. As a result, the pressure difference between the chambers of the brake power assist unit can be changed. Thus, on one hand, a brake pressure can be generated independently of the operation of the brake pedal 12 and, on the other hand, a brake pressure which is higher than the brake pressure corresponding to the position of the brake pedal can be generated by the master brake cylinder 14 in the master brake lines 13.

Figure 2:
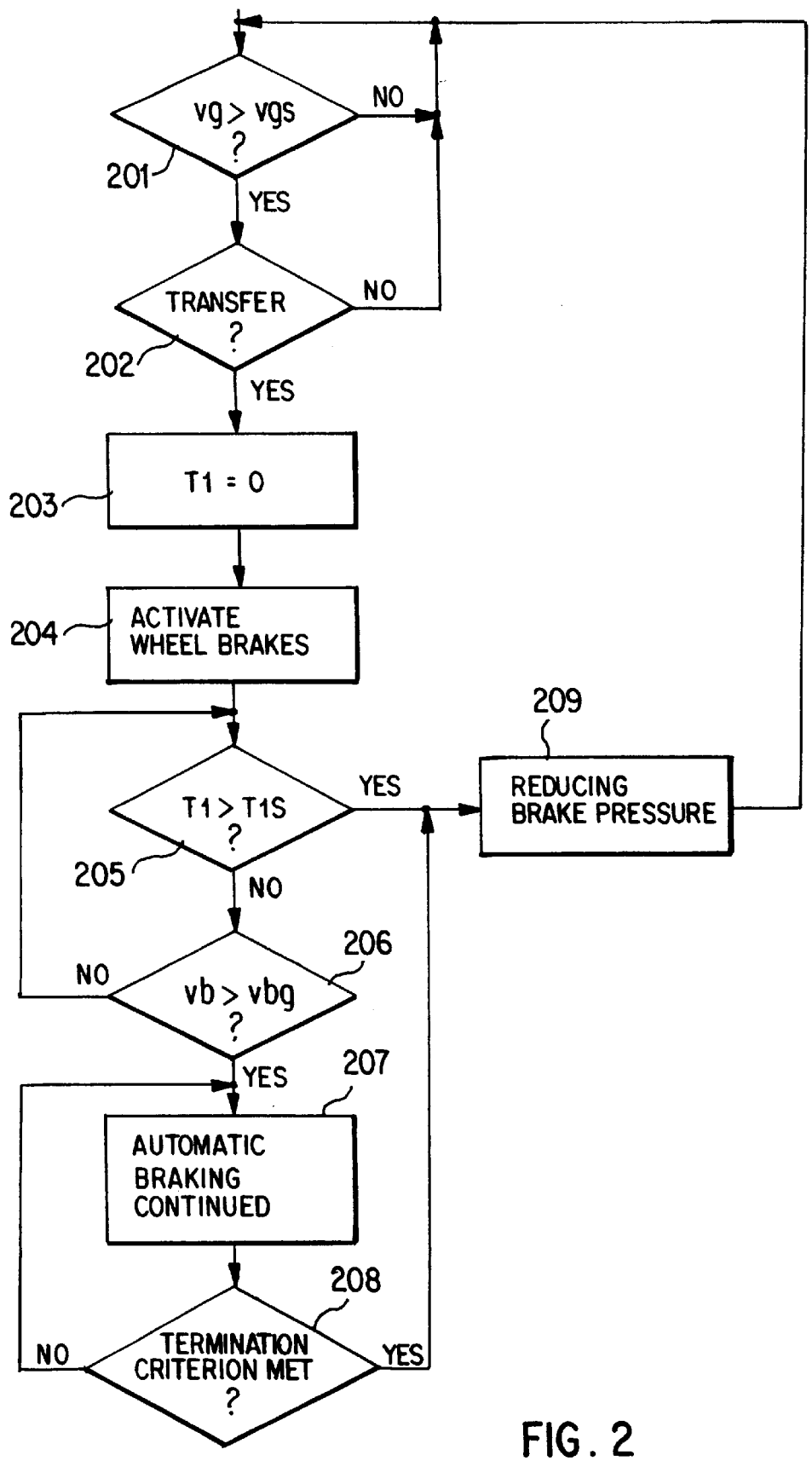
FIG. 2 is a flow chart of a first embodiment of the process according to the present invention.

Step 201 of FIG. 2 checks whether the accelerator pedal return speed (vg) exceeds a threshold value (vgs). In this case, the threshold value may have a fixed value, for example, above 75% of the maximal accelerator pedal return speed predetermined by the constructional features of the brake pedal. If this is not so, Step 201 is repeated. Otherwise, Step 202 checks whether a transfer of the driver's foot takes place from the accelerator pedal in the direction of the brake pedal. This can take place, for example, by way of a light barrier arranged between the two pedals or by another optical sensing device. If no transfer of the driver's foot takes place, a return to step 201 occurs.

Otherwise, Step 203, the first time sensing device T1 is set back to 0 and is started. According to Step 204, such a brake pressure is generated in the wheel brakes that the brake pads rest against the brake disks. Although this results in an only insignificant deceleration of the vehicle, by the bridging of the idling paths of the braking device, a faster brake pressure buildup will be ensured subsequently. Step 205 then checks whether the time sensing device T1 has determined an exceeding of the first time threshold value T1S. If this is so, in Step 209, the brake pressure is reduced in the wheel brakes and a return will then take place to Step 201.

Otherwise Step 206 checks whether the operating speed (vb) of the brake pedal (as the gradient of the brake pedal travel quantity representing the operation of the brake pedal) exceeds the threshold rise value (vbg). The threshold rise value is a predetermined value or a quantity determined from a given value which is determined as a function of the time T1. The use of threshold rise value as a function of the pedal operations preceding the brake pedal operation or their time sequence, is more fully explained in DE 44 13 172 C1, particularly regarding FIG. 1 to 3, and is incorporated herein by reference.

If the threshold rise value is not exceeded, a return to Step 205 takes place; otherwise the automatic braking operation according to Step 207 is continued. The automatic braking operation is continued such that the maximal pressure difference between the chambers is generated in the brake power assist unit. Thereby, the brake pressure in the wheel brakes is limited by an antilock system.

Step 208 checks whether the termination criterion for the automatic braking operation is met. Such a termination criterion is, for example, a reduction of the brake pedal travel or a reduction of the operating force of the brake pedal by the driver. A return to Step 207 takes place as long as the termination criterion is not met. Otherwise, a jump to Step 209 takes place and the brake pressure is reduced until the brake pressure is identical to the brake pressure which corresponds to the position of the brake pedal without the automatic braking operation.

Figure 3:
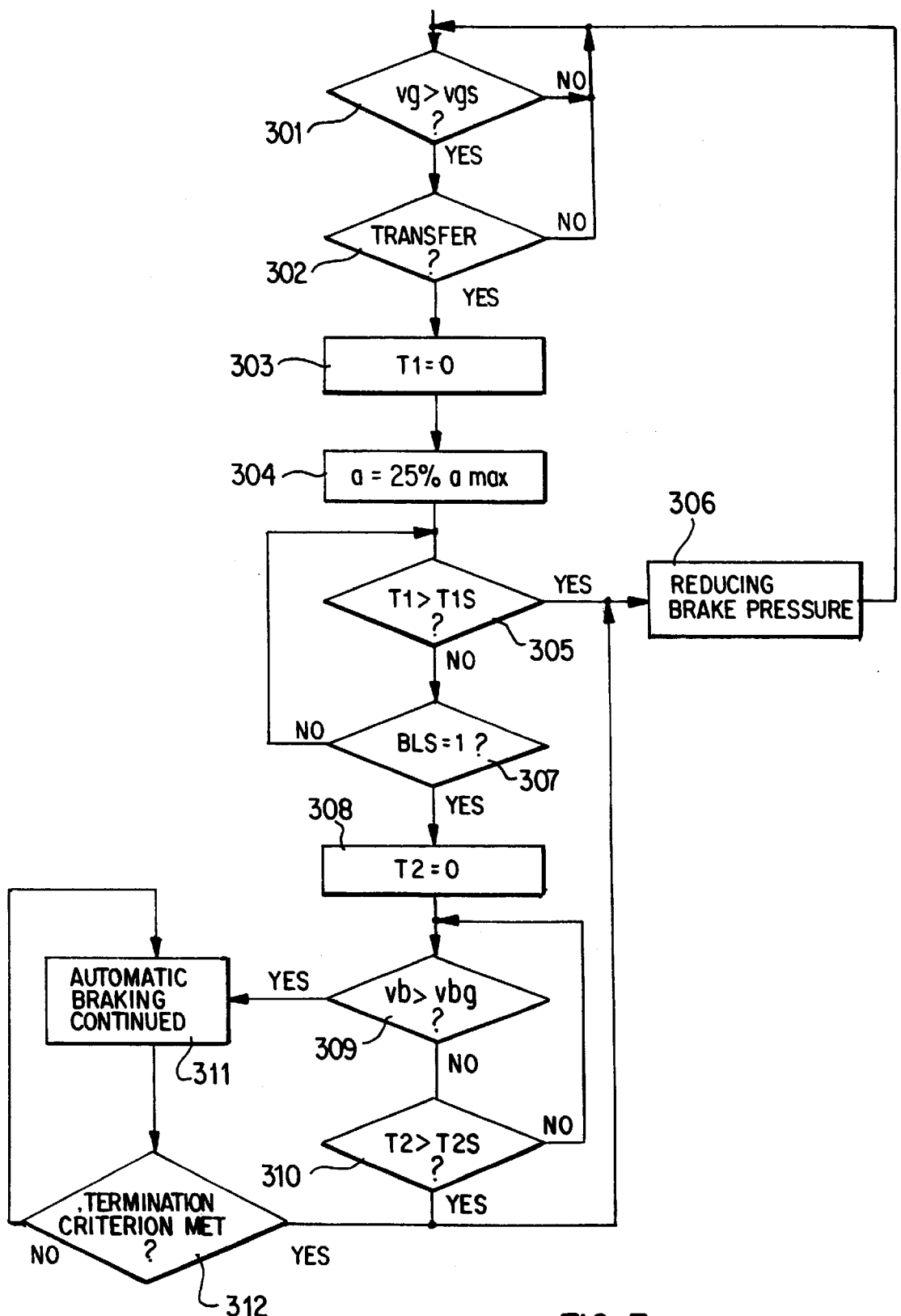
FIG. 3 is a flow chart of a second embodiment of the process according to the present invention.

In the embodiment of FIG. 3, Steps 301 to 303 of this process are identical with steps 201 to 203 of the process of FIG. 2. When Step 304 is reached, a brake pressure is controlled into the wheel brakes which is regulated such that the vehicle deceleration a reaches a defined proportion (here, e.g. 25%) of the maximal vehicle deceleration (amax). The maximal vehicle deceleration in this case may be either the vehicle deceleration which can be achieved with a maximal adhesion between the wheel and the road, or the maximal deceleration of the vehicle which can currently be achieved which can be determined by the estimating the adhesion coefficient.

The proportion is to be determined according to the reference quantity and is preferably in a range of 10% to 40% of the maximally achievable vehicle deceleration on which it is based. This approach allows the vehicle to be noticeably braked but with no braking taking place which from the start is so severe that the danger of a ramming from behind by the driver who is following too closely or at too high a speed. For this reason, it is advantageous for the operation of the vehicle brake lights to start simultaneously. This operation of the brake lights must differ from the conventional method of operation of the brake lights in a visually recognizable manner.

Subsequently, Step 305 checks whether the time T1 has exceeded the time threshold value (T1S). If this is so, a jump takes place to Step 206 and the brake pressure in the wheel brakes (ia) reduced, which is then followed by Step 301.

Otherwise, Step 307 checks whether the switching condition of the brake light switch BLS has changed from its inoperative switching condition to its operative switching condition. If this is not so, a return takes place to Step 305. Otherwise, the time sensing device T2 is set back to 0 in Step 308 and is started. Step 309 then checks whether the operating speed (vb) of the brake pedal has exceeded the threshold rise value vbg. If this is not so, Step 310 checks whether the second time T2 has exceeded the second time threshold value T2S. If this is so, a return takes place to Step 306. Otherwise, a return takes place to Step 309.

If it was determined in Step 309 that the operating speed (vb) of the brake pedal has exceeded the threshold rise value (vbg), the automatic braking operation is continued in Step 311. In this event, the automatic braking operation is continued such that at least some, preferably all wheels of the vehicle reach the intervention threshold of the antilock system. A maximal deceleration of the vehicle starting from this point in time is thereby ensured. Subsequent Step 312 checks whether a termination criterion (as described with reference to FIG. 2 and in the introduction to the specification) has been met. If this is not so, a return takes place to Step 311. Otherwise, a change takes place to Step 306, and the brake pressure is reduced to the brake pressure which corresponds to the brake pedal position.

The process according to the present invention determines the time threshold values T1S and T2S. These can be determined, for example, in driving tests. The determination of the second time threshold value T2S depends on the selection of the threshold rise value and of the first time threshold value T1S. The first time threshold value will assume a value of between 0.25 and maximally 1 second. The second time threshold value T2S will also assume a value within this interval. However, in this case, the second time threshold value can also be determined by the fact that the amount of the time T1 at the point in time of the switching of the brake light switch BLS is subtracted from its predetermined value. Then, a predetermined value of up to approximately 1.5 seconds may also be appropriate for the second time threshold value. However, these time data represent only a guideline. The coordination is also a function of the vehicle construction.

Figure 4:
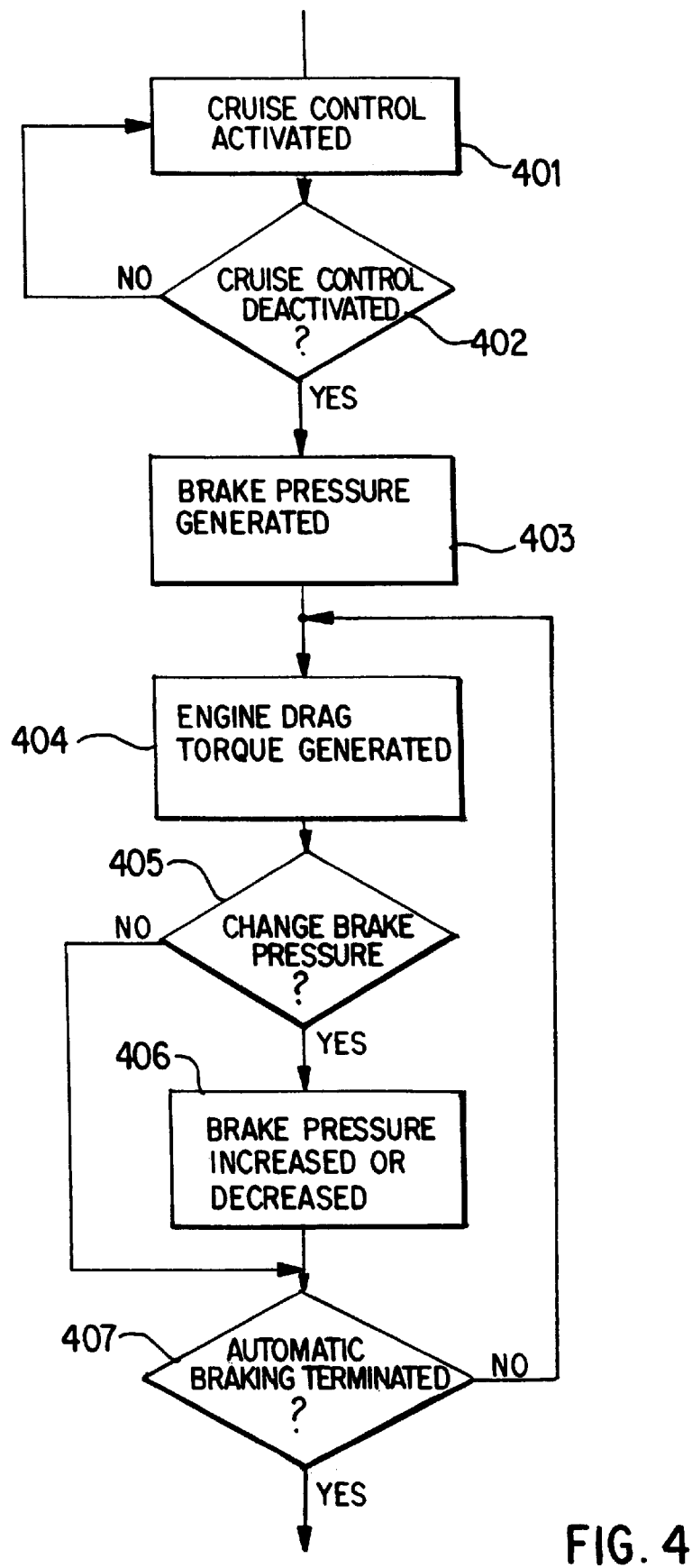
FIG. 4 is a flow chart of another embodiment of the process according to the invention with a cruise control.

If the vehicle has a cruise control option which sets the driving speed independently of the operation of the brake pedal by the driver to a value which can be predetermined by the driver, the process illustrated in FIG. 4 can also be carried out according to the present invention. Step 401 of the process activates the cruise control. Step 402 checks whether the cruise control is deactivated. This is always the case when, for example, an operation, also short-term, of the service brake takes place by the driver. Of course, the driver can also arbitrarily deactivate the cruise control device with operation of an operating element. If this is not so, according to Step 402, a return to Step 401 takes place.

When the cruise control is terminated, a change to Step 403 takes place. A brake pressure is generated in the wheel brakes such that the brake pads rest against the brake disk, but at first no braking effect is yet generated. Only the easing plays are overcome. Step 404 then generates an engine drag torque which decelerates the vehicle. In this case, a value for the desired vehicle deceleration is predetermined, and the engine drag torque is generated by way of interventions into the engine timing which are known to a person skilled in the art. Step 405 checks whether the brake pressure must be changed. It is the goal to leave the brake pressure at a level at which no braking effect is generated but, as described above, the easing plays are overcome.

Only when the drag torque of the engine is not sufficiently large, a jump takes place to Step 406; otherwise Step 407 checks whether the automatic braking operation is to be terminated. This is the case, for example, when the brake pedal is operated beyond a predetermined extent. For this purpose, for example, the operating force of the brake pedal by the driver can be used, as described above with respect to the above-described embodiments of the present invention.

The exceeding of an activating time of the automatic braking operation can also be used for its termination, in which case, however, activating times of several seconds (for example, up to 5 s) are acceptable. Another termination criterion is the renewed operation of the accelerator pedal by the driver because braking must also no longer take place. If it is determined in Step 407 that the braking operation is to be terminated, the process will end. Otherwise, a return takes place to Step 404.

Step 406 increases the brake pressure if the engine drag torque is not sufficient for generating the predetermined vehicle deceleration which may amount up to 40% of the maximal vehicle deceleration, but is particularly in a range from between 5 and 20% of the maximal vehicle deceleration. The brake pressure will be reduced in Step 406 if the engine drag torque was increased in Step 404 and the brake pressure is higher than the brake pressure required for overcoming the easing play.

In a further embodiment, the process can check, in a manner similar analogously to the approaches in FIGS. 2 and 3, whether the operation of the brake pedal takes place such that the gradient of a quantity representing the operation of the brake pedal by the driver exceeds a threshold rise value. If this is so, the automatic braking operation can be continued directly from the initial braking, and a brake pressure can be generated in the wheel brakes which is higher than the brake pressure which corresponds to the position of the brake pedal. This can, for example, take place by replacing Step 407 with Steps 506 to 510 of FIG. 5.

Figure 5:
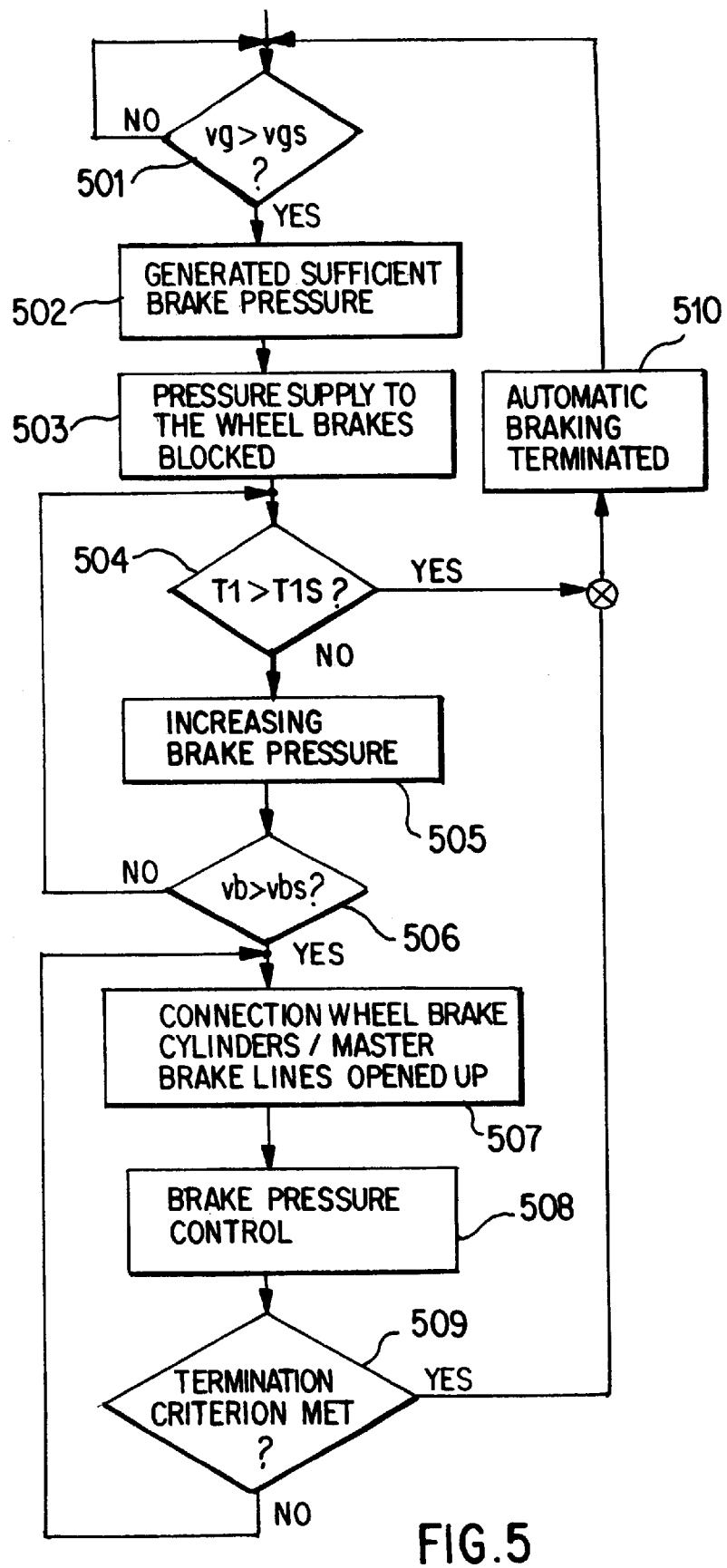
FIG. 5 is a flow chart of another embodiment of a process according to the present invention in which the triggering of the automatic braking operation takes place only on the basis of the return speed of the accelerator pedal.

In the embodiment according to FIG. 5, Step 501 checks whether or not the return speed (vg) of the accelerator pedal exceeds a threshold value (vgs). If this is not so, a return takes place to Step 501. Otherwise, Step 502 generates such a brake pressure in the wheel brakes that the brake pads rest against the brake disks. This takes place at a pressure in the order of from 1 to 2 bar. As an alternative, a brake pressure in the order of from 5 to 10 bar can also be generated which normally corresponds to a deceleration of the vehicle of between 1 m/s$^2$ and 2 m/s$^2$. Subsequently, Step 503 blocks the pressure supply to the wheel brakes so that the brake pressure in the wheel brake cylinders remains constant. This can take place particularly by controlling the brake pressure control valves as they are required for an antilock system.

Step 504 checks whether the first time sensing T1 has exceeded a first time threshold value. If this is so, a jump takes place to step 510. Otherwise, Step 505 increases the brake pressure further in the master brake lines leading to the wheel brakes. Then Step 506 checks whether a quantity (vb) which represents the operation of the brake pedal by the driver has exceeded a threshold rise value (vbs). As long as this is not the case, a return takes place to Step 504. Otherwise, the automatic braking operation according to Step 507 is continued in that the fluidic connection between the wheel bake cylinders and the master brake lines is opened up again.

As a result, the increased brake pressure of the master brake lines is introduced into the wheel brake cylinders so that a high deceleration of the vehicle is achieved very rapidly. In this event, it may be necessary according to Step 508 to carry out a brake pressure control by way of the antilock system (ABS). Here, the brake pressure introduced into the wheel brakes is higher than the brake pressure which corresponds to the position of the brake pedal.

Step 509 now checks whether the termination criterion for the automatic braking operation is met. If this is not so, a jump takes place back to Step 507. If the termination criterion has been met, a jump takes place to Step 510 where the automatic braking operation is terminated. For this purpose, it is first necessary to lower the braking pressure in the wheel brakes to the level corresponding to the position of the brake pedal which optionally may also be the pressureless brake (inoperative brake pedal). Subsequently, a jump can take place back to Step 501.

A particularly favorable embodiment of a brake system for carrying out the above-mentioned processes exists if, with the start of the automatic braking operation, the hydraulic connection is interrupted between the master brake cylinder and the wheel brakes and the brake pedal operates only against the force of a pedal travel simulator. The brake pressure at the wheel brakes will then be applied by a power pressure source. In this arrangement, the pedal travel of the brake pedal can be used particularly easily as the criterion for continuing the automatic braking operation because no reaction of the generated brake pressure occurs with respect to the brake pedal.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for carrying out an automatic braking operation, comprising the steps of sensing transfer of a driver's foot from an accelerator pedal toward a brake pedal;

triggering an automatic braking operation if an accelerator pedal return speed exceeds a threshold value and a transfer of the driver's foot is sensed; and thereby building up a brake pressure in wheel brakes and triggering a first time sensing;

sensing a quantity which represents operation of the brake pedal;

determining a gradient of a quantity representing the operation of the brake pedal, and terminating the automatic braking operation if the gradient exceeds a threshold rise value after exceeding a first time limit value by the first time sensing.

2. The process according to claim 1, wherein the quantity representing the operation of the brake pedal is one of the pedal travel, the operating speed of the brake pedal, and operating force of the brake pedal.

3. The process according to claim 1, wherein the threshold rise value is determined as a function of the time between triggering of the first time sensing and switching of the brake light switch.

4. The process according to claim 1, wherein, after the triggering of the automatic braking operation and before exceeding the threshold rise value by the gradient, the generated brake pressure is limited to a value which corresponds to application of brake pads onto a brake disk.

5. The process according to claim 4, wherein the quantity representing the brake pedal operation is brake pressure in a master brake line.

6. The process according to claim 1, wherein the brake pressure generated before brake pedal operation by a driver is limited to between about 5 bar and about 10 bar.

7. The process according to claim 1, wherein, after the triggering of the automatic braking operation and before exceeding the threshold rise value by the gradient, the brake pressure is regulated such that resulting vehicle deceleration does not exceed a predetermined proportion of maximally achievable vehicle deceleration.

8. The process according to claim 7, wherein the predetermined proportion is between about 10 and about 40%.

9. The process according to claim 7, wherein the quantity representing the brake pedal operation is brake pressure in a master brake line.

10. The process according to claim 1, wherein when, at the latest, a brake pressure is generated which corresponds to application of brake pads onto a brake disk, wheel brake cylinders are blocked with respect to master brake lines, thereby permitting a further pressure rise in the master brake lines, and the blocking of the master brake lines with respect to the wheel brakes is determined with brake pedal operation.

11. The process according to claim 1, wherein brake pressure in wheel brakes during the automatic braking operation is limited by an antilock system.

12. The process according to claim 1, wherein, after exceeding the threshold rise value by the gradient, a brake pressure which is higher than a brake pressure which corresponds to the brake pedal operation is generated.

13. The process according to claim 12, wherein the brake pressure generated after exceeding the threshold rise value by the gradient is of a magnitude to cause brake pressure regulation by an antilock system on at least some vehicle wheels.

14. The process according to claim 1, wherein the threshold rise value is determined as a function of the accelerator pedal return speed.

15. The process according to claim 1, wherein operation of brake lights is started independently of switching of a brake light switch by the triggering of the automatic braking operation.

16. The process according to claim 15, wherein, at least during time in which a brake pedal is not operated, the operation of the brake lights visibly differs from normal operation of the brake lights when the brake pedal is operated.

17. The process according to claim 1, wherein, after the termination of the automatic braking operation by satisfying a termination criterion or after the threshold rise value has not been exceeded within a predetermined time interval, a brake pressure which corresponds to a position of the brake pedal is set in the wheel brakes.

18. Process for carrying out an automatic braking operation, comprising the steps of
sensing a transfer of a driver's foot from an accelerator pedal toward a brake pedal;
triggering an automatic braking operation if an accelerator pedal return speed exceeds a threshold value and a transfer of the driver's foot is sensed; and thereby building up a brake pressure in wheel brakes and triggering a first time sensing;
switching a brake light switch from an inoperative into an operative switching position to trigger a second time sensing;
sensing a quantity representing the operation of the brake pedal;
determining a gradient of a quantity representing the operation of the brake pedal; and
terminating the automatic braking operation when the switching of the brake light switch does not take place before exceeding a first time limit value by the first time sensing, or the gradient of the quantity representing the operation of the brake pedal exceeds a threshold rise value after exceeding a second time limit value by the second time sensing.

19. The process according to claim 18, wherein the quantity representing the operation of the brake pedal is one of the pedal travel, the operating speed of the brake pedal, and operating force of the brake pedal.

20. The process according to claim 18, wherein the second time threshold value is determined as a function of a time between triggering of the first time sensing and the switching of the brake light switch.

21. The process according to claim 18, wherein the threshold rise value is determined as a function of the time between triggering of the first time sensing and switching of the brake light switch.

22. The process according to claim 18, wherein, after the triggering of the automatic braking operation and before exceeding the threshold rise value by the gradient, the generated brake pressure is limited to a value which corresponds to application of brake pads onto a brake disk.

23. The process according to claim 18, wherein the brake pressure generated before brake pedal operation by a driver is limited to between about 5 bar and about 10 bar.

24. The process according to claim 18, wherein, after the triggering of the automatic braking operation and before exceeding the threshold rise value by the gradient, the brake pressure is regulated such that resulting vehicle deceleration does not exceed a predetermined proportion of maximally achievable vehicle deceleration.

25. The process according to claim 24, wherein the predetermined proportion is between about 10 and about 40%.

26. The process according to claim 18, wherein when, at the latest, a brake pressure is generated which corresponds to application of brake pads onto a brake disk, wheel brake cylinders are blocked with respect to master brake lines, thereby permitting a further pressure rise in the master brake lines, and the blocking of the master brake lines with respect to the wheel brakes is determined with brake pedal operation.

27. The process according to claim 18, wherein, after exceeding the threshold rise value by the gradient, a brake pressure which is higher than a brake pressure which corresponds to the brake pedal operation is generated.

28. The process according to claim 18, wherein the brake pressure generated after exceeding the threshold rise value by the gradient is of a magnitude to cause brake pressure regulation by an antilock system on at least some vehicle wheels.

29. The process according to claim 18, wherein the threshold rise value is determined as a function of the accelerator pedal return speed.

30. The process according to claim 18, wherein operation of brake lights is started independently of switching of a brake light switch by the triggering of the automatic braking operation.

31. Process for carrying out an automatic braking operation, comprising the steps of
sensing accelerator pedal return speed;
triggering an automatic braking operation when the accelerator pedal return speed exceeds a threshold value; and thereby triggering a first time sensing;
generating a brake pressure; and
terminating the automatic braking operation when exceeding a first time limit value if previously a gradient of quantity representing brake pedal operation has exceeded a threshold rise value.

32. The process according to claim 31, comprising the further step of
with the brake pedal operation, triggering a second time sensing, whereby the automatic braking operation is terminated when exceeding threshold rise value by the quantity does not take place before the first time sensing exceeds the first time limit value, or an operating force of the brake pedal is larger than a predetermined operating force threshold value not before exceeding second time threshold value.

33. The process according to claim 32, wherein an operating force threshold value is in a range from about 100 to 200 N pedal force, and the second time limit value is in the range from about 100 ms to 300 ms.

34. The process according to claim 32, wherein the threshold rise value is determined as a function of the time between triggering of the first time sensing and switching of the brake light switch.

35. The process according to claim 31, wherein the quantity representing the operation of the brake pedal is one of the pedal travel, the operating speed of the brake pedal, and operating force of the brake pedal.

36. The process according to claim 31, wherein, after the triggering of the automatic braking operation and before exceeding the threshold rise value by the quantity, the generated brake pressure is limited to a value which corresponds to application of brake pads onto a brake disk.

37. The process according to claim 31, wherein the brake pressure generated before brake pedal operation by a driver is limited to between about 5 bar and about 10 bar.

38. The process according to claim 31, wherein when, at the latest, a brake pressure is generated which corresponds to application of brake pads onto a brake disk, wheel brake cylinders are blocked with respect to master brake lines, thereby permitting a further pressure rise in the master brake lines, and the blocking of the master brake lines with respect to the wheel brakes is determined with brake pedal operation.

39. The process according to claim 31, wherein the threshold rise value is determined as a function of the accelerator pedal return speed.

40. The process according to claim 31, wherein operation of brake lights is started independently of switching of a brake light switch by the triggering of the automatic braking operation.

41. Process for carrying out an automatic braking operation in a vehicle in which vehicle speed settable by a cruise control system independently of accelerator pedal operation, comprising the steps of using cruise control to obtain a predeterminable vehicle speed; and with termination of cruise control, triggering an automatic braking operation, whereby a brake pressure is generated in wheel brakes and corresponds to application of brake pads onto a brake disk.

42. The process according to claim 41, wherein deceleration is substantially generated by engine drag torque and is limited to a predetermined value.

43. The process according to claim 42, wherein, up to the predetermined value for the vehicle deceleration, the brake pressure is increased to obtain predetermined vehicle deceleration.

44. The process according to claim 42, wherein the predetermined vehicle deceleration is no greater than about 40% of the maximally achievable vehicle deceleration.

45. The process according to claim 44, wherein the predetermined vehicle deceleration is below about 20% of the maximally achievable vehicle deceleration.

46. The process according to claim 41, wherein with initiation of the automatic braking operation, a first time sensing is triggered, and the automatic braking operation is terminated when a gradient of a quantity representing brake pedal operation does not exceed a threshold rise value before the first time sensing exceeds a first time threshold value.

47. The process according to claim 46 wherein, with exceeding the threshold rise value by the gradient, the automatic braking operation is continued such that, until a termination criterion is met, a brake pressure which is higher than a brake pressure corresponding to the position of the brake pedal is generated.

48. The process according to claim 41, wherein operation of brake lights is started independently of switching of a brake light switch by the triggering of the automatic braking operation.

\* \* \* \* \*